US009255798B2

(12) United States Patent
Kahlow

(10) Patent No.: US 9,255,798 B2
(45) Date of Patent: Feb. 9, 2016

(54) SURVEY DEVICE

(71) Applicant: Keith Kahlow, Baraboo, WI (US)

(72) Inventor: Keith Kahlow, Baraboo, WI (US)

( * ) Notice: Subject to any disclaimer, the term of this patent is extended or adjusted under 35 U.S.C. 154(b) by 56 days.

(21) Appl. No.: 14/300,349

(22) Filed: Jun. 10, 2014

(65) Prior Publication Data

US 2014/0360031 A1  Dec. 11, 2014

Related U.S. Application Data

(60) Provisional application No. 61/833,149, filed on Jun. 10, 2013.

(51) Int. Cl.
*G01C 5/00* (2006.01)
*G01C 15/06* (2006.01)

(52) U.S. Cl.
CPC ..................... *G01C 15/06* (2013.01)

(58) Field of Classification Search
CPC ....... G01C 15/06; G01C 15/105; G01C 15/08
USPC .................... 33/286, 290, 293, 392
See application file for complete search history.

(56) References Cited

U.S. PATENT DOCUMENTS

| | | | | |
|---|---|---|---|---|
| 4,029,415 A * | 6/1977 | Johnson | ............. | G01C 15/004 33/294 |
| 5,481,809 A * | 1/1996 | Rooney | ............. | G01C 15/105 33/286 |
| 6,762,830 B1 * | 7/2004 | Connolly | ............. | G01C 15/004 356/138 |
| 7,611,105 B1 * | 11/2009 | Carazo | ............. | G01C 15/06 33/286 |
| 7,886,450 B1 * | 2/2011 | Fiano | ............. | G01C 15/02 33/286 |
| 2010/0212169 A1 * | 8/2010 | Fleenor | ............. | G01C 15/08 33/228 |
| 2011/0258865 A1 * | 10/2011 | Clarke | ............. | F16M 11/041 33/293 |
| 2012/0272536 A1 * | 11/2012 | Nishita | ............. | G01C 15/06 33/290 |
| 2014/0373370 A1 * | 12/2014 | Kodaira | ............. | G01C 15/00 33/290 |

OTHER PUBLICATIONS

"Trimble Rapid Positioning System", Trimble MEP, Jan. 20, 2015. URL:<https://www.youtube.com/watch?v=wnzeGtRMm-s>. Accessed on the Internet Feb. 24, 2015 (2 pages).
"Trimble unveils new software for MEP contractors", Construction Week Online, Nov. 9, 2010. URL:<http://www.constructionweekonline.com/article-10089-trimble-unveils-new-software-for-mep-contractors/>. Accessed on the Internet Feb. 24, 2015 (1 page).
"3D Layout Navigator, Topcon LN-100", GeotekVermessung, Feb. 11, 2014. URL:<https://www.youtube.com/watch?v=-Ao1RGBLAvM>. Accessed on the Internet Feb. 24, 2015 (2 pages).
"SPS730 and SPS930 Universal Total Stations", Trimble Heavy Civil Construction, copyright 2015. URL:<http://construction.trimble.com/products/site-positioning-systems/sps730-and-sps930-universal-total-stations>. Accessed on the Internet Feb. 24, 2015 (3 pages).
"New option in active prisms", xyHt, Nov. 11, 2014. URL:<https://www.youtube.com/watch?v=uZ6IgTXIvxM>. Accessed on the Internet Feb. 24, 2015 (2 pages).
"Sh*t Surveyors Say", WSP in Canada, Oct. 29, 2012. URL:<https://www.youtube.com/watch?v=Xiu47GwX2T8>. Accessed on the Internet Feb. 24, 2015 (2 pages).
"Sokkia robotic compact DXAC+ TOPO and STAKE", Le Tu, Aug. 12, 2013. URL:<https://www.youtube.com/watch?v=nmkX5Q-dn0E>. Accessed on the Internet Feb. 24, 2015 (2 pages).

* cited by examiner

*Primary Examiner* — G. Bradley Bennett
(74) *Attorney, Agent, or Firm* — Winthrop & Weinstine, P.A.

(57) ABSTRACT

A survey device may include a shaft portion having a longitudinal axis, a prism having a center point and being arranged near the top of the shaft portion and offset laterally relative to the longitudinal axis of the shaft portion, and a laser having a laser emission point in general alignment along the shaft portion with the center point of the prism.

20 Claims, 5 Drawing Sheets

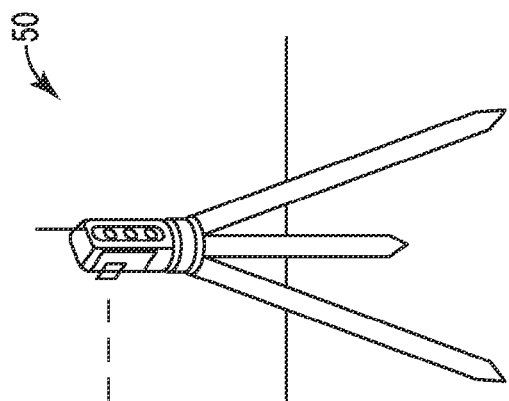
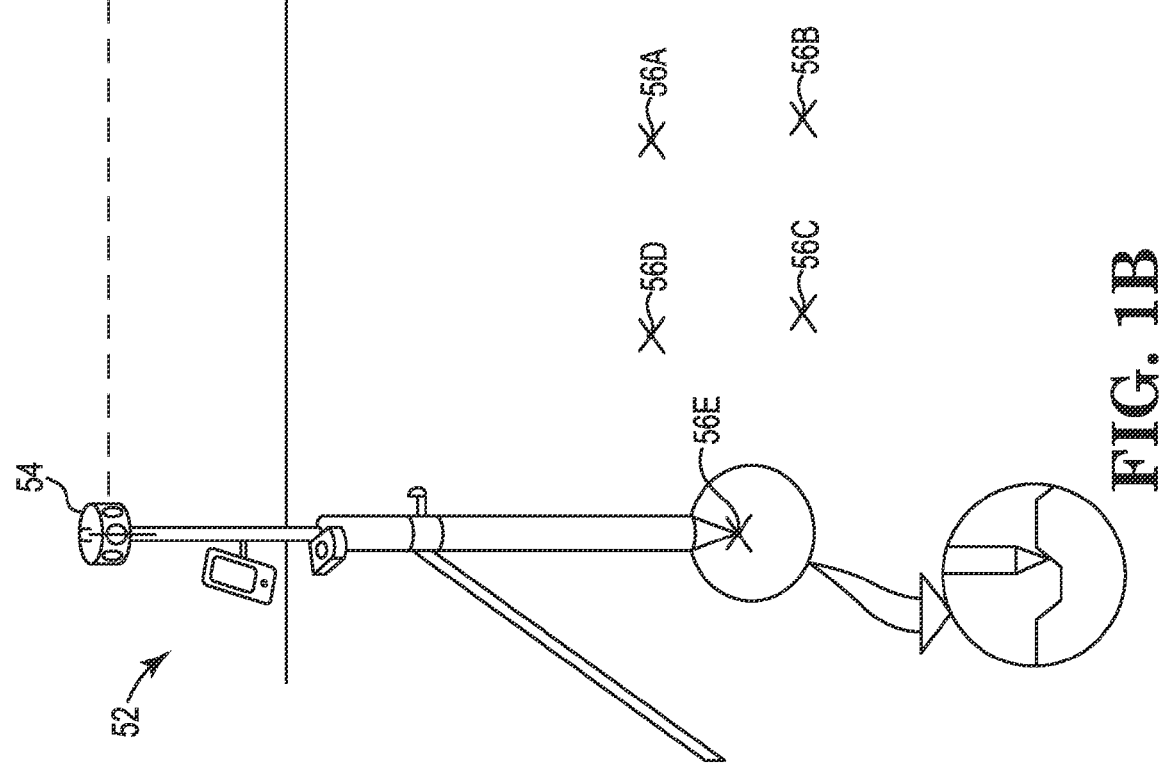

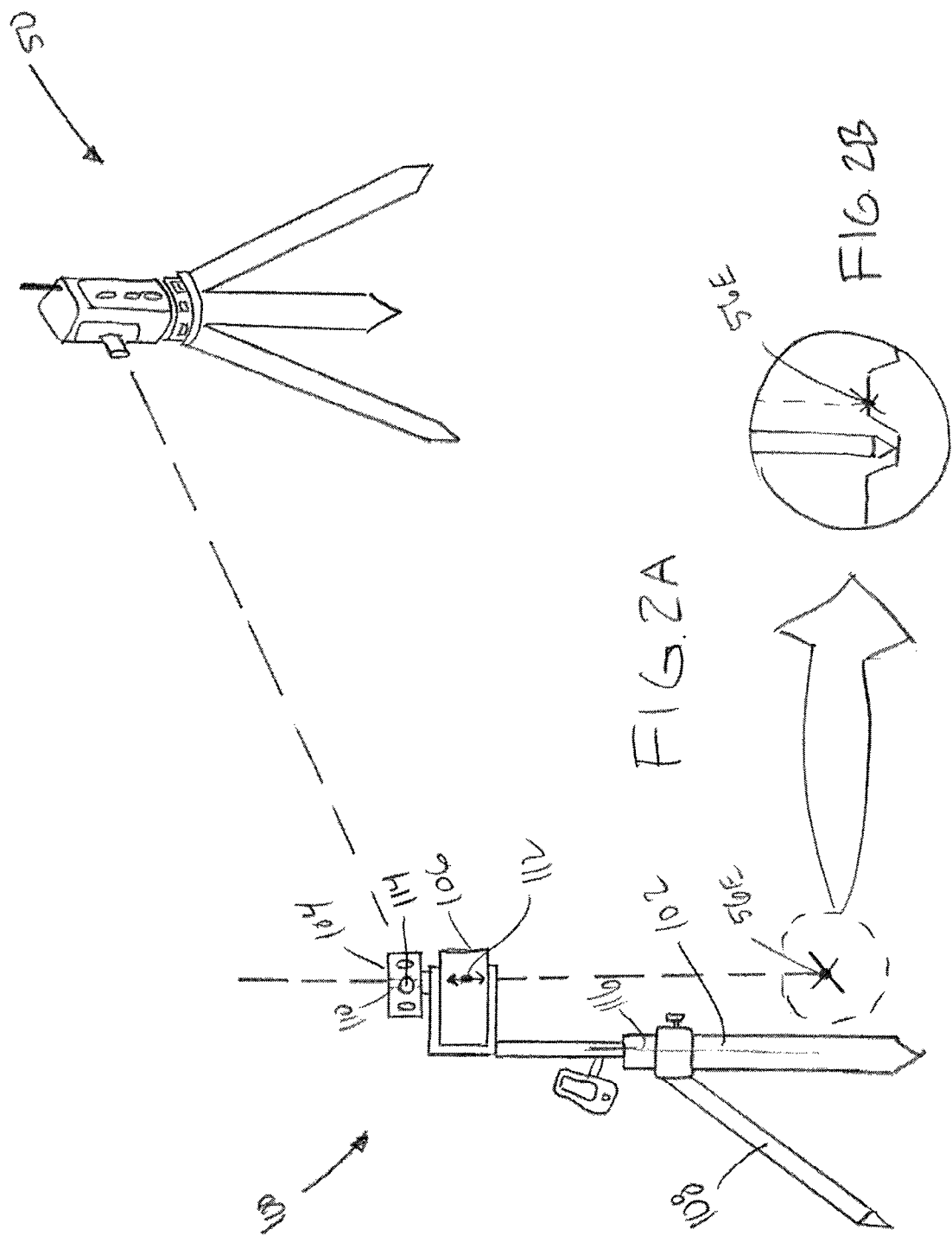

US 9,255,798 B2

SURVEY DEVICE

CROSS-REFERENCE TO RELATED APPLICATIONS

The present application claims priority to U.S. Provisional Patent Application No. 61/833,149 filed on Jun. 10, 2013, entitled Survey Device, the content of which is hereby incorporated by reference in its entirety.

FIELD OF THE INVENTION

The present disclosure relates generally to land surveying. In particular, the disclosure relates to systems and methods for use in site layout. Still more particularly, the disclosure relates to an improved surveying rod for use with a robotic total station or other transit system in locating and laying out particular positions on a project site based on architectural or engineering drawings or models, such as, for example, Building Information Modeling (BIM).

BACKGROUND

A common approach to laying out construction projects includes the use of a transit and a survey rod. Current transit technologies include total stations and robotic total stations allowing for relatively quickly determining the position of the survey rod without the use of separate distance measuring devices and without resorting to manual adjustments of the angle turned by the transit. Rather, the spatial analysis capabilities of the total station allow the location of the survey rod to be determined electronically once detected. The detection of the rod may be provided by optical communication between the total station and a prism arranged on the survey rod.

In use, a total station or robotic total station may be provided with a series of points that can be used to construct a building or arrange electrical conduit, plumbing, or duct work in a building, for example, or to construct other structures such as bridges, roadways, or other projects. In some cases a BIM model may be uploaded to the total station to provide points for layout of a building, components thereof, or for other types of projects. The total station can then be used to repeatedly check locations of the survey rod and as correct locations are identified, survey stakes, paint, pins, or other markings can be made to guide the construction of the facility. For purposes of simplicity, references to total station throughout the specification may include robotic total stations and those without robotic capacity. That is, a reference to a total station should not be construed as excluding robotic total stations.

An accurate layout is dependent, in part, on the relative location of the prism near the top of the rod and the bottom point of the rod. That is, the system may assume that the location of the prism is directly above the location on the ground and, thus, if the prism is in the correct location, the point at the bottom of the rod reflects the correct location on the ground. Accordingly, leveling bubbles are often provided on the rod to assure that the rod is plumb.

The layout of each location is typically done by placing the survey rod in an estimated location and checking the location with the transit. Each time the rod is placed, the rod is plumbed and the location is checked. The transit may be able to tell how far off the rod is such that the correct location can be more closely approached each time. However, the rod may be replaced at a new location and each time the rod is placed it is typically plumbed before the location is checked.

SUMMARY

In some embodiments, a survey device may include a shaft portion having a longitudinal axis. The device may also include a prism having a center point. The prism may be arranged near the top of the shaft portion and it and/or its center point may be offset laterally relative to the longitudinal axis of the shaft portion. The survey device may also include a laser having a laser emission point in general alignment along the shaft portion with the center point of the prism.

In another embodiment, a survey device may include a prism having a center point. The prism may be configured for arrangement at or near the top of a survey pole while being offset laterally relative to the longitudinal axis of the survey pole. The survey device may also include a laser having a laser emission point. The laser may be configured for arrangement such that the laser emission point is in general alignment along the survey pole with the center point of the prism.

In still other embodiments, a method of laying out a point may include positioning a survey pole having a prism and a plumb bob laser at a point. The method may also include checking the location of the point with a transit in communication with the prism. The method may also include swaying the top of the pole until the prism is in the correct position as determined by the transit. The may still further include identifying a point on a surface based on the indication of the point on the surface by the laser.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

BRIEF DESCRIPTION

FIG. 1A is a diagram of a transit and a survey rod without a plumb bob laser.

FIG. 1B is a close up view of the base of the survey rod of FIG. 1A on uneven formwork, according to some embodiments.

FIG. 2A is a diagram of a transit and a survey rod having a plumb bob laser, according to some embodiments.

FIG. 2B is a close up view of the base of the survey rod of FIG. 2A on uneven formwork, according to some embodiments.

DETAILED DESCRIPTION

Figure 3C:
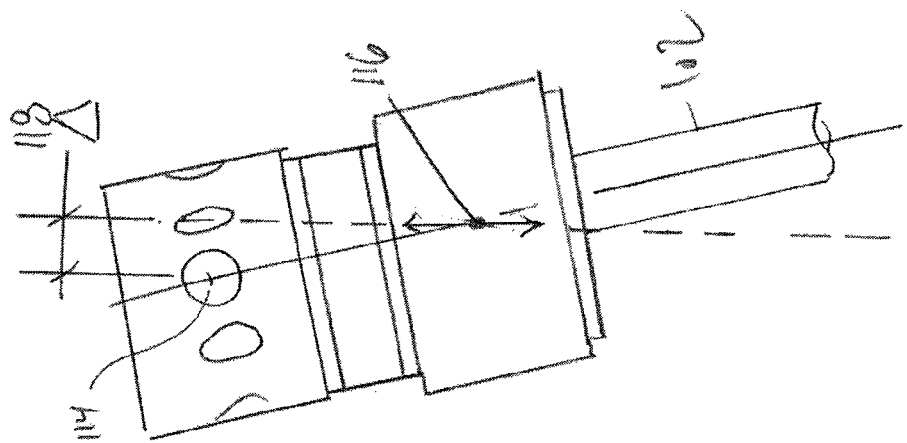
FIG. 3C shows a close up front view of the prism and plumb bob laser of FIGS. 3A and 3B where the survey rod is in a tipped condition.

The present disclosure relates to a survey rod for simplifying the process of field locating a layout point. In some embodiments, the survey rod may include a plumb bob laser arranged immediately below the prism allowing for a location on the ground that is directly below the prism to be more quickly identified without the need to make sure that the survey rod is perfectly plumb. In other embodiments, the prism may include a hole passing therethrough and the plumb bob laser may be directed through the prism allowing points above and/or below the prism to be identified. In still other embodiments, the plumb bob laser may be incorporated into the prism, substantially eliminating even small errors due to the rod being out of plumb. In this embodiment, the plumb bob laser may also direct laser light both upward and downward.

In any of these embodiments, the rod may be placed at a location and the top of the rod may be swayed side to side and front to back until the transit indicates that the prism is in the correct location based on data from a drawing, model, or other source. Once the prism is properly located, the plumb bob laser may naturally identify a location on the ground and/or above the prism reflective of the horizontal position (i.e., X/Y position) of the prism and, thus, the proper layout position of the point being located. The user may mark the location and move on to located additional points. The improved survey rod may reduce the amount of time needed for laying out each point because the time spent plumbing the rod may be eliminated each time the rod is placed. Still further, because point may be located without the rod being exactly plumb, the location may be located with fewer rod placement attempts. Moreover, when uneven ground is encountered and it is difficult to place the rod in some locations, the current system may help avoid placing the rod in these difficult spots. When the saved time is accumulated over the layout of several attempts at each point and over the several layout points on a project, the amount of time saved can reflect a time savings of 50% to 75% or more.

FIG. 1A shows a transit 50 and a survey pole 52. As shown, the transit 50 can see and identify the X, Y, and Z position of the location of the prism 54 on the top of the survey pole 52. As also shown, the prism 54 is aligned with the longitudinal axis of the rod 52 and the ground position 56 corresponding to the prism position may be provided by the relatively pointed tip of the rod 52 when the rod 52 is plumb. It is noted that the discrepancy between the position of the prism 54 relative to the rod tip is based, at least in part, on the out-of-plumb angle of the rod 52 together with the length of the rod 52. Still further, where the rod 52 is bent or otherwise not straight, further discrepancy can occur affecting the accuracy of the location. As shown, the survey pole may be used to attempt to locate the proper position by placing the pole at positions 56A, 56B, 56C, and 56D, before arriving at the desired position of 56E. As is also shown in FIG. 1B, where the ground is uneven, locating the rod tip at a particular point can be difficult. As shown, for example, on elevated floor decks where fluted formwork is used to form concrete decks, it can be difficult to place the rod tip on the sloping surface of the flute. Still further, the system of FIG. 1A does not have the ability to transfer the prism position upward to a ceiling or other surface. Still further, marking the point that the rod tip is occupying can be cumbersome. The several embodiments described in the present application address many of these problems that may be encountered with current survey systems.

FIG. 2A shows a system including a transit portion 50 and a survey rod 100 according to one embodiment. The transit portion 50 may function to establish a centralized location relative to which several other locations are identified. The survey rod 100 may allow the other locations to be identified by positioning the survey rod 100 at several other locations and checking the location with the transit portion 50 and marking the location of the survey rod 100 when it is placed in locations that are desired for identification.

The transit portion 50 of the system may include an angle measuring theodolite and a surveyor's tape may be used to measured distance, for example. In other embodiments, a total station or robotic total station may be used for the layout where angles and distances are measured by the total station. In either case, the transit portion 50 may include a tripod system of legs for securing the theodolite or total station in a position convenient for human viewing therethrough or manipulation of the settings of the total station, for example. That is, the theodolite or total station may be positioned between 3 feet and about 7 feet above the supporting surface and the legs of the tripod may be telescoping for suitable positioning of the transit or total station. While the transit portion has been described as a theodolite, total station, or robotic total station, any device for identifying the location of the surveyor's rod 100 relative to the transit portion 50 may be used. For example, while the relative location of the total station and the survey rod 100 is described herein as an optical and/or light-based communication between the total station and a prism, still other methods of sending and receiving signals for purposes of locating an object may also be used including sonar, radar, laser scanning, and other known or later developed systems for location identification.

With particular reference to the survey rod 100, such may include a supporting portion 102, a point identification device 104, and a vertical transfer device 106. In the embodiment described, the supporting portion 102 may be in the form of a shaft portion, the point identification device 104 may be in the form of a prism, and the vertical transfer device 106 may be in the form of a plumb bob laser. The shaft may support the prism in a position elevated above the ground or other surface, the prism may allow for the location of the prism to be identified by the transit 50, and the plumb bob laser may transfer the position of the prism to the floor and/or the ceiling or other surface above the survey rod using a plumb laser line. For purposes of clarity in the present description, the functional concepts of support, location identification, and vertical transfer will be described with respect to the particular embodiments shown (i.e., shaft, prism, plumb bob laser), but nothing described herein should be construed as limiting the functions performed to these particular adaptations.

The supporting or shaft portion 102 of the survey rod may be configured for supporting and/or positioning a point identification device or prism 104 arranged thereon at a height generally similar to that of the transit 50 or at another height making the location manipulation of the prism suitable and/or convenient for the user. The shaft portion may be adjustable in length by having a telescoping portion or multiple telescoping portions and may include a plumbing bubble allowing the shaft to be plumbed when desired by a user. A brace leg 108 may be provided for bracing and/or plumbing the rod in a single direction while allowing the rod to be tipped or swayed in a direction substantially perpendicular to the brace leg.

The prism may be configured for receiving and reflecting light impulses from a robotic total station, for example. Based on the reflected light, the robotic total station may be configured for identifying the location of the prism. Several manufacturers of surveying prisms are known and may include Seco, Lieca, and Trimble, for example. Still other brands and types of prisms may be used. The prism may include a focal point, nodal points and the like and may be arranged relative to a housing. The prism and the total station may be calibrated such that the center of the housing reflects the location of the prism. As such, in known survey systems, the prism may be placed atop a survey pole and may be centered on the survey pole. As can be seen in FIG. 2A, the center of the prism in this embodiment may be offset from the center of the shaft portion.

In some embodiments, the prism may include an open bore 110 extending from a top of the prism to the bottom of the prism and the bore 110 may be arranged along a central longitudinal axis of the prism, for example. The bore 110 may allow the transmission of laser light or other wavelengths of radiation to pass through the center of the prism. The bore 110 may be sized to allow laser light to pass therethrough when the light is substantially parallel to the axis of the bore 110 or when the light is slightly skewed relative to the bore 110. As such, the bore 110 may have a diameter ranging from approximately $1/16^{th}$ inch to approximately $1/2$ inch, or a bore diameter ranging from approximately $1/8$ inch to approximately $3/8$ inch, or a bore diameter of approximately $1/4$ inch may be used. Still other bore diameters inside the ranges mentioned or outside these ranges may be provided. In some embodiments, the bore diameter may be selected to prevent usage of the device when it is relatively highly out of plumb. For example, when directing laser light upward, when the device is tipped too far, the upwardly extending laser light may be interrupted by the sidewall of the open bore 110, indicating to the user that the device is too far out of plumb. In other embodiments, the amount out of plumb may be left to the discretion of the user.

The vertical transfer device 106 may be configured to transfer the location of the prism to a lower and/or supporting surface or an overhead surface, or both. In the present embodiment, the vertical transfer device 106 may be in the form of a self-leveling or plumb bob laser. The self-leveling aspect of the laser may be such that the laser is directed in a vertical direction generally irrespective of the orientation of the housing of the laser. Several manufacturers of self-leveling lasers are known and may include PLS, Hilti, and Bosch for example. Still other brands and types of self-leveling lasers may be used.

The relative position of the prism and the laser may be configured such that the laser identifies a point below and/or above the prism generally corresponding to the center of the prism. As shown in FIG. 2A and shown more closely in FIGS. 3A and 3B, the point of emission 112 of the laser may be aligned with the center of the prism 114 in a direction substantially parallel to the longitudinal axis 116 of the rod. As such, when the rod is in a plumb condition, the laser may pass directly through the center of the prism thereby allowing the location of the center of the prism to be transferred to the floor or ceiling or other surfaces below and above the rod. The bore 110 in the prism may allow the laser light to pass therethrough, thereby allowing for point identification above the system as well as below. It is to be appreciated, as shown in FIG. 2B, that the position of the rod may not need to be at the same location as the point desired to be located and may allow for some flexibility allowing for the point of the rod to be placed on a flat surface while allowing the point to be located on a sloped or other surface, for example.

Figure 3B:
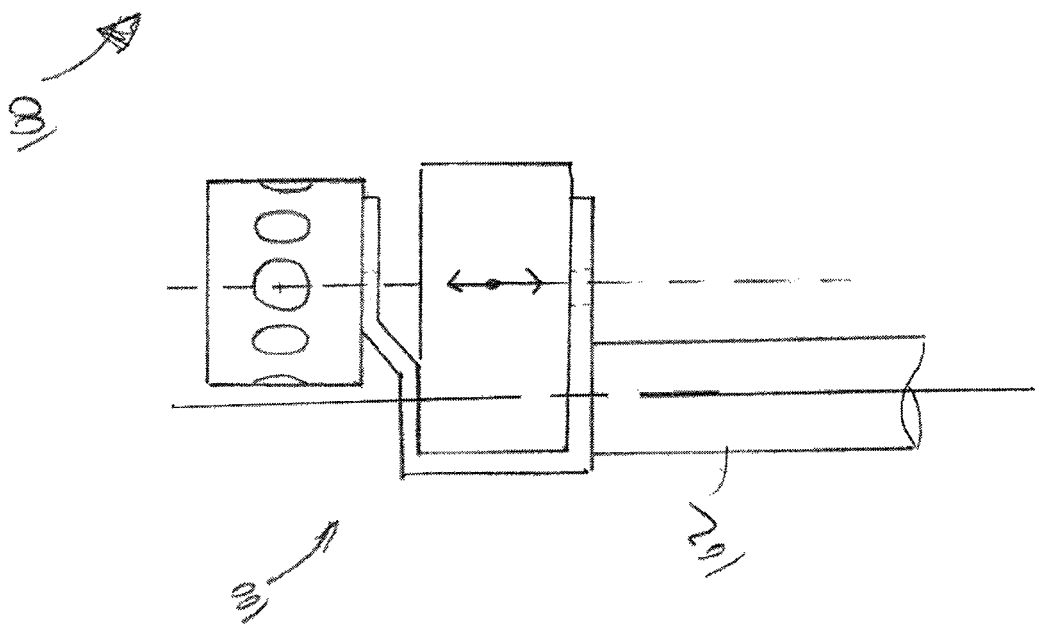
FIG. 3B shows a close up side view of the prism and plumb bob laser of FIG. 3A.
Figure 3A:
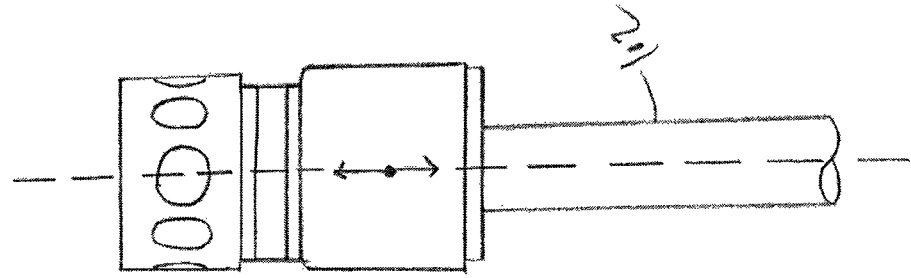
FIG. 3A shows a close up front view of a prism and plumb bob laser, according to some embodiments.

Referring now to FIG. 3C, a survey rod 100 that is positioned out of plumb is shown. The angle of out of plumb of the rod in FIG. 3C has been exaggerated for purposes of explanation. As shown, the angle of out of plumb may cause the center of the prism 114 and the vertically projecting laser to fall out of alignment with respect to the vertical direction. That is, the center of the prism 114 and the emission point 112 of the laser may remain in alignment with respect to the longitudinal axis of the shaft, but due to the out of plumb position of the shaft, the center of the prism 114 and the emission point 112 of the laser are not in alignment vertically and are out of alignment by a distance of delta 118. However, the distance, delta 118, between these two points is relatively small when compared to the relative distance between the prism and, for example, the point of the rod 102 which is at the bottom of the rod 102 and in contact with the supporting surface of the rod 102. As such, small angles of out of plumb of the rod 102 combined with a short distance between the center of the prism 114 and the emission point 112 of the laser allow for the rod 102 to be used and provide substantially accurate results without taking the time to assure that the rod 102 is plumb. That is, a user may hold the rod 102 generally upright as determined by the naked eye and such may provide sufficient accuracy in identifying a point for a structure. For purposes of comparison, it is assumed that the rod is 5 feet long, the distance between the center of the prism 114 and the emission point 112 of the laser is 2 inches, and the angle of out of plumb of the rod is 10 degrees (or 0.0872 radians) in one direction and substantially plumb in the orthogonal direction. In this situation, the delta 118 of FIG. 3C may be approximately 0.17 inches, while the delta between the center of the prism 114 and the bottom of the rod may be approximately 5.23 inches. As such, with respect to errors due to out of plumb survey poles, the present embodiment may reduce the size of these errors by approximately 96-97%. In many cases this reduction in error is sufficient to allow a survey crew to avoid taking the time to assure that the survey pole 102 is in a substantially plumb condition allowing for a substantial savings in the amount of time spent locating points in a layout.

Figure 4:
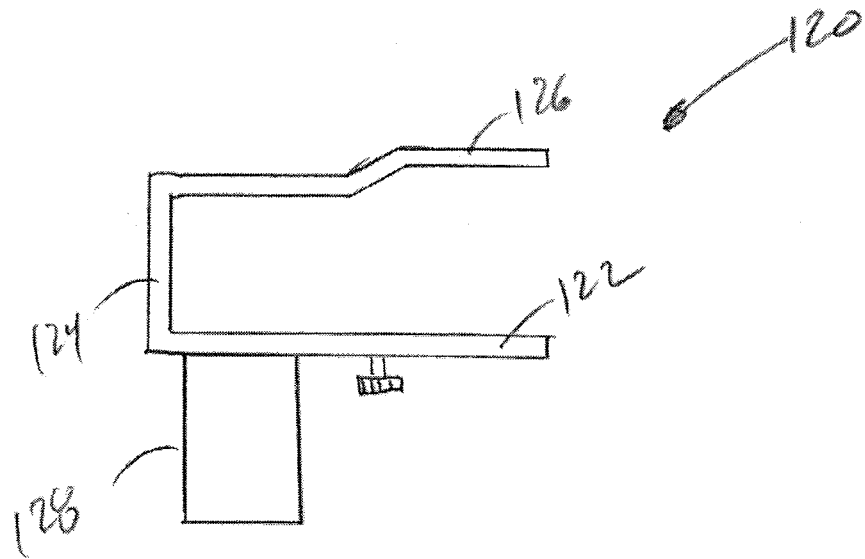
FIG. 4 is a perspective view of a bracket for supporting the plumb bob laser on a survey rod, according to some embodiments.

Turning now to FIG. 4, a bracket 120 is shown that may be used to support the prism and the plumb bob laser on a survey pole or rod 102. As shown, the bracket 120 may include a laser supporting member 122, a riser 124, and a prism supporting member 126. The bracket 120 may also include a threaded coupling 128 arranged on an underside of the laser supporting member. The coupling 128 may be adapted for attachment to a common survey pole 102, and, as such, may include a $5/8$" adapter fitting that may be readily threaded onto the top of a survey pole 102. The coupling 128 may be secured to the laser supporting member 122 by welding, bolting, adhering or other methods and systems for securing the coupling may be provided. The laser supporting member 122 may include a top surface adapted for resting a laser thereon. A set screw may also be provided extending upwardly from the bottom of the bracket 120 for securing the laser between the laser supporting member 122 and the prism supporting member 126. Additional keeper elements such as edge ribs, or engaging bumps or elements may be provided on the bracket 120 to hold or maintain the laser in position. The riser 124 may be secured to the laser supporting member 122 and may extend upwardly from the laser supporting member 122 in a direction substantially opposite the position of the survey pole 102. The riser 124 may define the spacing between the laser supporting member 122 and the prism supporting member 126 and, as such, may have a length adapted to accommodate the a plumb bob laser. The prism supporting member 126 may extend away from the riser 124 in a direction substantially parallel to the laser supporting member 122 thereby creating a cavity or recess for positioning of the laser. In some embodiments, the prism supporting member 126 may taper slightly upward as shown to elevate the prism away from the laser and provide for lines of sight to the prism, when, for example, the transit 50 is lower than the prism. A coupling or other securing device may also be provided on the prism supporting member 126 for securing the prism thereto.

In some embodiments, the several parts of the bracket 120 may be formed from plate-like structures. In other embodiments rod-like or webbing-type structures may be used. In still other embodiments, the arrangement of the prism and the laser may be reversed such that the prism is below the laser and the laser is above the prism. In still other embodiments, the coupling of the bracket 120 to the survey pole 102 may be via the riser or the prism supporting member in lieu of the laser supporting member. Still other configurations and arrangements of the bracket 120 shown may be provided and are within the scope of the invention.

Figure 5:
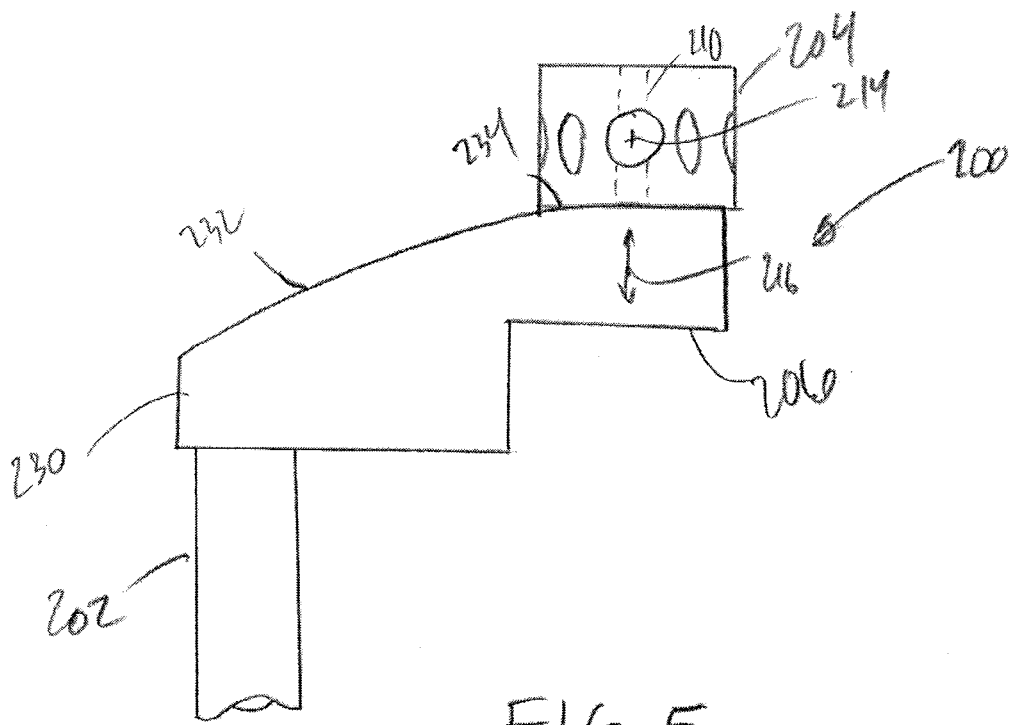
FIG. 5 is a side view of the top of a survey pole including a plumb bob laser and supporting a prism thereon, according to some embodiments.
Figure 6:
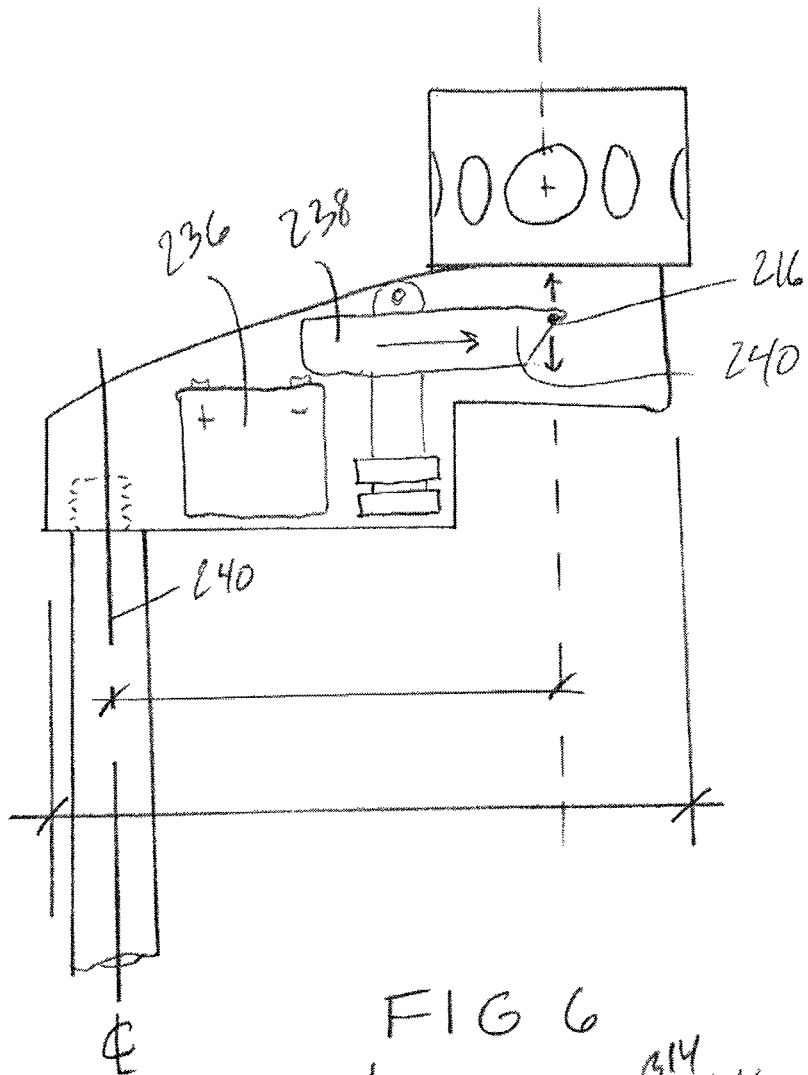
FIG. 6 is a cross-sectional view of the top of the survey pole of FIG. 5.

Turning now to FIGS. 5 and 6, another embodiment of a survey rod or pole 200 is provided. This embodiment may be the same and/or similar in many respects to the embodiment shown in FIGS. 1-3. That is, the survey rod or pole 200 may include a shaft portion 202, a prism 204, and a plumb bob laser 206. In this embodiment, however, the bracket and plumb bob laser may be incorporated with one another to provide a plumb bob laser that may be mounted directly onto the top of the shaft portion 202. That is, the housing or frame or body of the plumb bob laser 206 may include a threaded bore into which the top of the shaft portion 202 may be threaded. Other attachments mechanisms between the shaft 202 and the laser housing may also be provided. The laser may also be configured for positioning of the prism on a top surface thereof in alignment with the point of emission 216 with the laser. The prism 204, like the earlier embodiment may include a bore 210 extending vertically therethrough to allow the laser light to pass upwardly (or downwardly for other arrangements) through the laser. In this embodiment, the distance between the center of the prism 214 and the emission point 216 of the laser 206 may range from approximately ¼ inch to approximately 4 inches, or from approximately ½ inch to approximately 2 inches or a distance of approximately ¾" may be provided. This particularly small distance between the prism center 214 and the laser emission point 216 may further minimize the delta distance (see FIG. 3C) between the center of the prism 214 and the emission point 216 of the laser when the shaft portion 202 is not plumb.

In this embodiment, the housing 230 of the laser 206 may be curved or sloping 232 from the survey pole 202 upwardly to a surface 234 on which the prism 204 may be arranged. The curved or sloping surface 232 may be convex as shown or a concave surface may be provided. The sloping surface 232 may be advantageous to avoid interference or obstruction to viewing of the prism 204 by a transit device 50, for example. That is, where the transit 50 is lower than the prism 204 and is viewing the prism in a slightly upward fashion, the housing of the laser 206 may have a tendency to obstruct the view if the transit 50 is viewing the prism 204 from the pole side of the prism 204, for example. The curved shape of the laser housing 230 may, thus, allow for an unobstructed view of the prism 204.

As shown in cross-section in FIG. 6, the laser 206 may include a battery 236, a supporting leveling mechanism 238, and a laser 240 supported by the leveling mechanism and powered by the battery 236. The several parts of the device 206 may be arranged to create an offset between the emission point 216 of the laser and the longitudinal axis of the pole 240. Still other arrangements may be provided.

Figure 7:
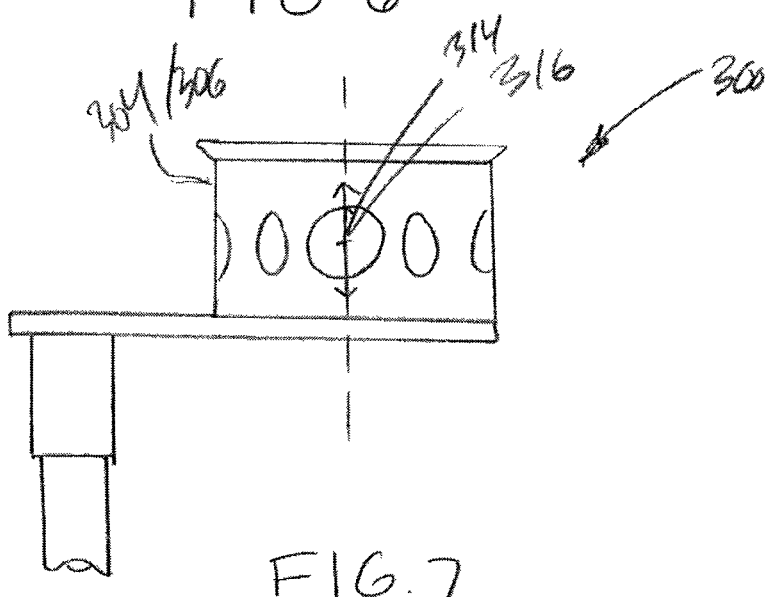
FIG. 7 is a diagram of a transit and a survey rod having a plumb bob laser incorporated into the prism, according to some embodiments.

Referring now to FIG. 7, yet another embodiment of a survey rod 300 may be provided. For example, in this embodiment, the prism 304 and the plumb bob laser 306 may be configured such that the emission point 316 of the laser 306 and the center point 314 of the prism 304 are located at the same point. As shown, for example, the prism 304 and the plumb bob laser 306 may be incorporated into one device and the leveling mechanism of the laser may be arranged within the prism and may be configured for holding laser light emitting device in a position such that the emission point 316 of the laser is positioned at the center point 314 of the prism 304 and remains at the center of the prism 304 when the prism 304 is arranged out of plumb.

The presently described embodiments may simplify the process of marking a point on the floor, ceiling, or other surface below or above the prism. That is, the self-leveling nature of the laser allows the user to avoid having to assure that the rod is plumb. In addition, the offset nature of the laser allows the point to be more freely marked than when it is identified by the pole point. Still further, the offset nature of the laser may allow the point of the rod to be placed in convenient locations offset from the point being identified and may avoid the need to place the pole on sloping surfaces, ridges, or other locations where placing the pole may be difficult.

Although the invention has been described with reference to various embodiments, persons skilled in the art will recognize that changes may be made in form and detail without departing from the spirit and scope of the invention.

What is claimed is:

1. A survey device comprising:
   a shaft portion having a longitudinal axis;
   a prism having a center point and being arranged near the top of the shaft portion and offset laterally relative to the longitudinal axis of the shaft portion; and
   a laser having a laser emission point in general alignment along the shaft portion with the center point of the prism.

2. The device of claim 1, wherein the laser is a plumb bob laser configured to emit a laser in a substantially vertical direction.

3. The device of claim 2, wherein the prism is a survey prism configured to reflect light in a manner configured to define the center point of the prism.

4. The survey device of claim 1, wherein the laser is spaced from the prism generally parallel to the longitudinal axis of the shaft portion.

5. The device of claim 1, further comprising a bracket configured for coupling to the shaft portion and securing the prism and laser in relative alignment.

6. The device of claim 5, wherein the bracket comprises a laser supporting member, a riser, and a prism supporting member.

7. The device of claim 6, wherein the prism supporting member is spaced from the laser supporting member by a distance configured to receive a laser.

8. The device of claim 6, wherein a portion of the prism supporting member tapers slightly upward and away from the laser supporting member.

9. The device of claim 4, wherein the laser comprises a housing configured to receive the shaft portion.

10. The device of claim 9, wherein the housing is configured support the prism.

11. The device of claim 10, wherein the housing is curved and sloping from a point at or near the shaft portion to a surface on which the prism is arranged.

12. The device of claim 11, wherein the curved and sloping portion of the housing is a convex surface.

13. The device of claim 1, wherein the laser emission point is positioned at the center point of the prism.

14. The device of claim 13, wherein the laser is arranged within the prism.

15. A survey device comprising:
- a prism having a center point and being configured for arrangement at or near the top of a survey pole while being offset laterally relative to the longitudinal axis of the survey pole; and
- a laser having a laser emission point and being configured for arrangement such that the laser emission point is in general alignment along the survey pole with the center point of the prism.

16. The survey device of claim 15, wherein the laser is spaced from the prism generally parallel to a longitudinal axis of the pole on which the prism and laser are configured to be arranged.

17. The survey device of claim 16, wherein the laser emission point is positioned at the center point of the prism.

18. A method of laying out a point, comprising:
- positioning a survey pole having a prism and a plumb bob laser at a point;
- checking the location of the point with a transit in communication with the prism;
- swaying the top of the pole until the prism is in the correct position as determined by the transit;
- identifying a point on a surface based on the indication of the point on the surface by the laser.

19. The method of claim 18, wherein the surface is a surface above the user.

20. The method of claim 19, wherein positioning the survey pole comprises placing the survey pole on a generally flat surface and identifying a point comprises marking a location on a generally uneven surface adjacent the generally flat surface.

* * * * *